April 29, 1952 J. M. WOLFSKILL 2,595,037

PIEZOELECTRIC CRYSTAL APPARATUS

Filed Feb. 25, 1948 2 SHEETS—SHEET 1

Inventor
John M. Wolfskill

By Ben J. Chromy, atty.

Inventor
John M. Wolfskill

By Ben. J. Chromy atty

Patented Apr. 29, 1952

2,595,037

UNITED STATES PATENT OFFICE 2,595,037

PIEZOELECTRIC CRYSTAL APPARATUS

John M. Wolfskill, Erie, Pa.

Application February 25, 1948, Serial No. 10,887

5 Claims. (Cl. 171—327)

Figures 1, 2, 3, 4, 5, 6, 7, 8:
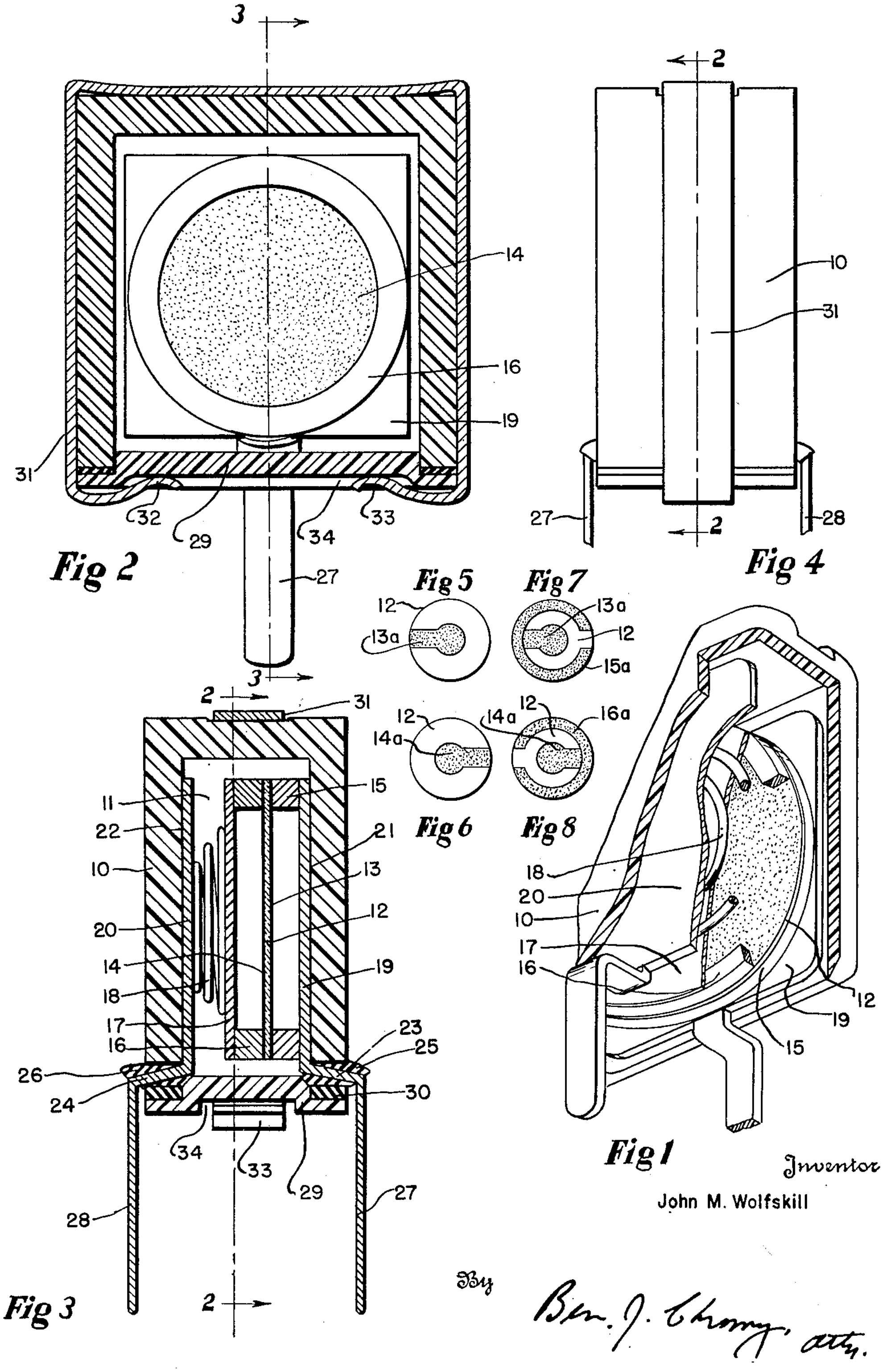

This invention pertains to an arrangement for mounting piezoelectric crystals. More particularly this invention relates to an arrangement for mounting thin piezoelectric crystals to facilitate handling of such crystals and provide improved performance.

It is an object of this invention to provide a piezoelectric crystal with contiguous electrodes of varying areas and configuration to elicite good response in the crystal on different harmonics.

It is another object of this invention to make good electrical contact to plated electrodes provided to piezoelectric crystals at such a point or area as to reduce the damping action of such contact as well as the contact resistance.

It is another object of this invention to provide a rigid support for thin piezoelectric crystals to prevent strain in the crystal blank due to its mounting or clamping support.

Another object of this invention is to provide a mounting arrangement for piezoelectric crystals to enable the handling of quartz crystal blanks lapped to as thin as .001″ so they may be rigidly clamped and mounted into the holder without breakage due to this operation.

A further object of this invention is to provide a rigid support means to piezoelectric crystals of sufficiently small proportions that it may be readily sealed in a small housing, the housing itself providing the backing support for the spring means which hold the clamping members together against the crystal.

Another object of this invention is to provide an arrangement whereby a piezoelectric crystal blank may be plated or loaded to a specific frequency so that it may be adjusted to an exact frequency by deposition of additional metal over the base plated electrode.

Another object of this invention is to provide a piezoelectric crystal blank with means of carrying away and dissipating the heat generated in the crystal unit itself through good thermal contact to rings clamping the crystal blank.

Other and further objects will be apparent to those skilled in the art to which this invention relates from the following specification, claims and drawing.

In the prior art of mounting high frequency crystals of either fundamental or harmonic types, the problem of breakage during the mounting operation was always a serious one. This was particularly true of crystals which used contiguous electrodes especially during the operation of making contact to these contiguous electrodes, such as, electrodes deposited either by evaporation, sputtering, fired, metal plated or otherwise that provide better high frequency response with less damping on the crystals' oscillation. Of the various methods tried to support and make contact to such contiguous surfaces, the one described herein was found to have many advantages. It overcomes the difficulties of twisting, bending at the edges, chipping, by providing first of all two flat surfaces between which the crystal blank is clamped. These two flat surfaces may clamp the crystal blank only on its periphery or may extend in towards the center as far as desirable depending on the required activity and other performance characteristics desired of the crystal unit. Such clamping means may be either square, round or rectangular. The particular illustration shows that of a round crystal in which two metal rings which have their sides lapped flat, are held against the face of the crystal by means of a spring which is compressed by the sides of the holder envelope.

The electrodes of the plated crystal then make direct electrical and thermal contact to the crystal surface. The entire assembly is held together by means of a housing which has means for bringing out these electrical contacts.

The housing itself can act as the means for maintaining pressure on the assembly, or a skeleton arrangement can be used to provide this holding together means, and the housing simply used as a protecting device, with contacts extending through the case. The advantages of a skeleton device which must be arranged to at least insulate one ring from the other, is that the entire assembly may be plated to frequency by depositing metal, and when the desired frequency is obtained the skeleton unit is then simply placed in the housing. Both arrangements can be used depending on the frequency tolerance desired to be obtained with such a unit. That is, the crystal assembly could be loaded to a specific frequency by evaporating metal in a dummy type holder, in which part of the case has been removed and then simply transfer the assembly as plated to such a specific frequency, to the finished housing. Such transfer operations may slightly alter the frequency and in very precise applications this method might be sufficient to take it outside the specified tolerance.

If the crystal has the electrode plated over the entire area of the blank or approximately so, the metal rings can be closed. If only a small area is to be used as the crystal electrode, the metal ring can contact a small pigtail brought out from the small electrode and can again cover the entire periphery of the crystal blank or the ring need not be a closed ring, but it can have an open slot, or be only slightly more than a semicircle if it is desirable to form it this way from the mechanical standpoint.

The rings can also be made of ceramic or other insulating material in which case a coating of silver is applied to the ring by firing a silver paste to the lapped ceramic face and bringing the contact around to the backside of the ring. The silver plated surface then contacts the electrode on the crystal surface of the pigtail in the case of the button type electrode.

The ceramic ring type can then be utilized in a housing as shown in which case the contact plates contact the silver on the backside of the ceramic ring.

The insulated ring type holder can also be mounted in a metal type housing in which case the ceramic rings are held together against the crystal by means of small U shaped springs. These also serve to make contact to the silver plating and to bring out leads for the external connections.

Figure 9:
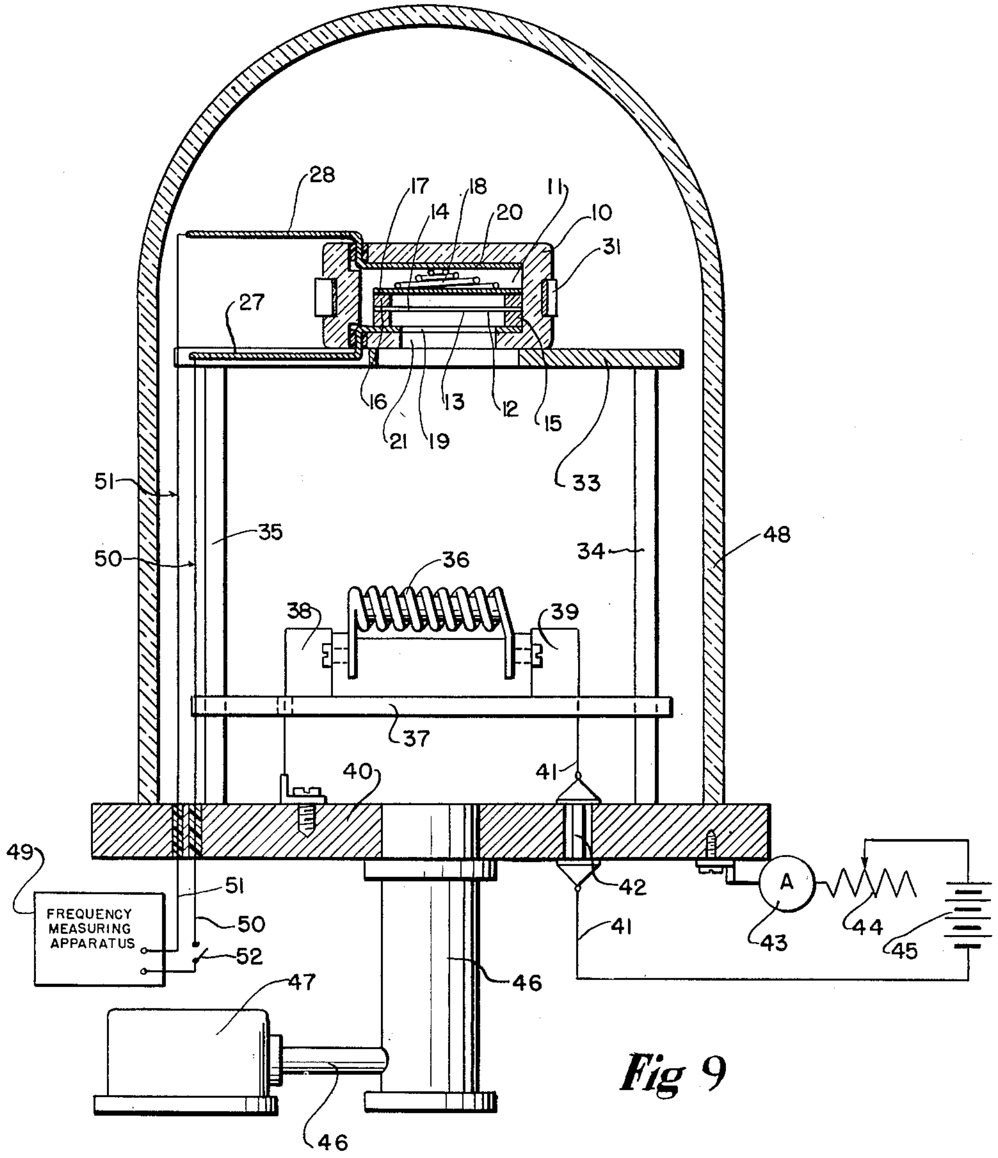

These and other features of this invention will be set forth in detail in the following specification, claims and drawing in which briefly, Figure 1 is a partially cut-away sectional view of a piezo electrical crystal holder embodying features of this invention. Figure 2 is a sectional view of the piezo electrical crystal holder taken along the lines 2—2 of Figure 3; Figure 3 is a sectional view taken along the line 3—3 of Figure 2. Figure 4 is an external view of the crystal holder. Figures 5 and 6 are views showing the major faces and small button electrodes of a crystal blank that may be employed in this holder. Figures 7 and 8 are views showing the major faces of a crystal blank provided with electrodes such as shown in Figures 5 and 6 and a modified form of clamping ring that may be employed in accordance with this invention, and Figure 9 is a sectional view of an apertured holder through which additional metal is being evaporated to a crystal blank electrode.

Referring to the drawing in detail, a housing 10 of insulating material, such as, "Bakelite" and the like is provided with a cavity 11 into which may be pressed the piezo electrical crystal blank, support and electrode assembly. The piezo electrical crystal 12 is provided with electrodes 13 and 14 that may be plated, sputtered, evaporated, sprayed or otherwise applied to the major faces of the crystal blank. The electrode 13 extends substantially to the periphery of the crystal blank and is contacted by the metallic ring 15 which is of substantially the same diameter as the circular crystal blank. Likewise the electrode 14 extends substantially to the periphery of the crystal blank and is in contact with the metallic ring 16. The surfaces of the rings 15 and 16 that engage the crystal blank surfaces and the electrode surfaces are preferably lapped flat. A metallic disk 17 is pressed into engagement with the ring 16 by the spring 18 and this spring functions to hold the crystal blank 12 and rings 15 and 16 in assembled relation between the electrodes 19 and 20. The electrode 19 is positioned between the innersurface of the wall 21 of the housing 10 and the ring 15 and forms electrical contact with this ring. The electrode 20 is positioned between the inner surface of the wall 22 of the housing 10 and the spring 18 and makes contact with the ring 16 through the metallic disk 17 and the spring 18. The aforesaid elements consisting of the crystal blank 12, the rings 15 and 16, the disk 17 the spring 18 and the electrodes 19 and 20 when assembled and positioned in the housing cavity are under compression by the spring 18 and the crystal blank is supported in the assembly by the tension of the spring 18 so that this crystal blank cannot fall out of its assembled position.

The electrodes 19 and 20 are provided with offset extensions 23 and 24 respectively which are substantially narrower than the main electrode surface and extend out of the housing 11 through suitable rubber grommets 25 and 26 respectively. The external tab portions 27 and 28 integral with the electrodes 19 and 20 respectively from connectors for connecting the piezo electrical crystal blank 12 into an electrical circuit. The mouth of the housing 10 is covered by the cover 29 which may also be made of "Bakelite" or other suitable plastic or other preferably insulating material and this cover is provided with a gasket 30 which is adapted to be compressed between the edges of the housing 10 around the mouth thereof and the cover 29 by the closure member 31 which hugs surfaces of the outside of the housing. The closure member 31 is provided with the spring like extension members 32 and 33 which engage the cover 29 in the recess 34. The member 31 is, of course, made of resilient material so that it may be sprung into place after the crystal blank and electrode assembly is inserted into the cavity of the housing and the cover 29 is applied over the mouth of the housing.

This holder may also be employed with crystal blanks 12 that are provided with small button shaped electrodes 13*a* and 14*a* as shown in Figs. 5 and 6 and in this case each of the button electrodes 13*a* and 14*a* is provided with a "pigtail" or connection extending on a narrow part of the surface of the corresponding major crystal face to the edge. These "pigtails" may extend in the opposite directions or they may extend in the same directions or in directions disposed at right angles or in acute or obtuse angles to each other. Rings 15*a* and 16*a* are provided for contacting the "pigtails" of the electrodes 13*a* and 14*a*, respectively, and these rings may be closed rings or they may be only partial rings, that is, open rings and they may be metal or ceramic coated or partially coated with metal and function to contact the electrode "pigtails" to connect the crystal blank 12 into an electric circuit. The rings 15*a* and 16*a* are also lapped flat and hug the crystal blank in the same manner as the rings 15 and 16.

In Fig. 9 there is illustrated an apparatus for providing additional metal to an electrode of the crystal blank to alter the frequency of the crystal blank while it is in operation, that is, while it is functioning either as a filter or as an oscillator. The crystal blank 12 and housing 10 shown in Fig. 9 are essentially the same as illustrated in Figs. 1, 2, 3 and 4 except that the side wall 21 of the housing 10 and the electrode 19 are each provided with large corresponding apertures and therefore the parts of the crystal unit shown in Fig. 9 are identified by the same reference numerals as corresponding parts of Figs. 1, 2, 3 and 4.

The housing 10 shown in Fig. 9 is supported on the table 33 so that the apertures through the wall 21 and electrode 19 are positioned over a corresponding aperture in the table 33 directly over the metal coil 36 from which metal is evaporated to the surface of the electrode 13. The table 33 is supported over the coil 36 by suitable legs 34 and 35 resting on the base 40 and the table 37, carrying the coil 36 and coil supports 38 and 39, is also supported by these legs 34 and 35. All of this apparatus is enclosed in the bell jar 48 that rests on the base 40 and the atmosphere from the inside of the bell jar 48 is evacuated by the pumping apparatus 47 through the pipes 46.

The coil 36 is heated electrically by current supplied by the battery 45 or other source of current supply and the current fed to the coil 36 may be varied by the rheostat 44 and measured by the meter 43. The battery 45 is connected to one metal support 39 of the coil 36 by the wire 41 passing through the insulator 42 sealed into the base 40 and the other metal support 38 of the coil 36 is connected to the metal base 40. The ammeter 43 is also connected to the base 40. The terminals 27 and 28 of the crystal unit are connected to the frequency measuring apparatus 49 by the wires 50 and 51, respectively, that pass through suitable insulators sealed in the base 40. This frequency measuring apparatus is of conventional design and may take various forms operating the crystal blank both as an oscillator or signal absorber and the crystal blank 12 may or may not be connected to the apparatus 49 continuously but may be connected intermittently by the switch 52 during the electrode coating operation.

The coating of the electrode 13 by metal evaporated from the coil 36 proceeds when the coil 36 is heated after the inside of the bell jar 48 is evacuated through the pipe 46 by the pumping apparatus 47. This evaporation process is well known and will not be described in detail. This evaporation coating process may be replaced or supplanted by other coating processes, such as, plating, sputtering, spraying and the like also well known and it is not desired to restrict this invention to any one of these processes.

The coating process is carried on until the frequency of the crystal blank 12 is shifted the desired amount as indicated on the measuring apparatus 49 and then the crystal unit may be removed from the bell jar. The hole through the wall 21 of the housing 10 of the crystal unit may be closed by inserting a suitable threaded plug or by cementing a suitable closer thereto after the frequency of the unit is adjusted.

When the electrode 13 is to be plated to shift the frequency of the crystal blank this electrode 13 may be connected into the plating circuit and metal such as silver, gold, copper etc. deposited on this electrode from the plating bath. Where the sputtering process is employed an arrangement similar to that shown in Fig. 9 may be employed and positive ions of metal may be sputtered from the heated coil 36 to the electrode 13 by a properly polarized high voltage electric field applied therebetween in the evacuated chamber 48. In this case the legs 34 and 35 must, of course, insulate the table 33 and crystal unit from the coil 36.

While I have described this invention in detail with respect to certain embodiments thereof it is obvious that I do not desire to limit the invention to the exact details described except insofar as they are defined by the claims.

What I claim is:

1. A piezoelectric crystal apparatus comprising: a piezoelectric crystal blank having a pair of major faces and having a thickness that is a small fraction of a diameter of said crystal blank, electrodes for said major faces, ring shaped elements for clamping peripheral portions of said major faces therebetween and for contacting said electrodes, a disc engaging one of said ring shaped elements, a spring engaging said disc, a pair of contacting members, one of said contacting members engaging said spring and the other of said contacting members engaging the other of said ring shaped elements, and a housing, said last mentioned contacting member and the corresponding side of said housing having apertures through which additional metal may be applied to the corresponding one of said electrodes for adjusting the frequency of said crystal blank after it is mounted in said housing.

2. A piezoelectric crystal apparatus comprising: a piezoelectric crystal blank having a pair of major faces, a housing having a cavity therein for receiving said crystal blank, electrodes for said major faces, ring shaped elements on each side of said crystal blank for clamping peripheral portions of said major faces therebetween and for contacting said electrodes, a disc engaging the outer side of one of said ring shaped elements, a spring engaging the outer side of said disc, a pair of contacting members positioned against opposite surfaces of said cavity, one of said contacting members engaging said spring and the other of said contacting members engaging the other of said ring shaped elements, said crystal blank, said ring shaped elements, and said disc being supported under compression between said contacting members in said cavity, a closure for said cavity, flat terminals integral with said contacting members extending to the exterior of said cavity past edges of said closure, and means for hermetically sealing said closure to the mouth of said cavity and over surfaces of said flat terminals.

3. A piezoelectric crystal apparatus comprising: a piezoelectric crystal blank having a pair of major faces, a housing having a cavity therein for receiving said crystal blank, electrodes for said major faces, ring shaped elements for clamping peripheral portions of said major faces therebetween and for contacting said electrodes, a disc engaging one of said ring shaped elements, a spring engaging said disc, a pair of contacting members positioned against opposite surfaces of said cavity, one of said contacting members engaging said spring and the other of said contacting members engaging the other of said ring shaped elements, said crystal blank, said ring shaped elements, said disc, and said spring being adapted to be assembled together between said contacting members and inserted into said cavity, flat terminals attached to said contacting members, said terminals projecting out of the mouth of said cavity and having bent portions extending across the lips of the mouth of said cavity, a closure for said cavity, and means for hermetically sealing said closure to the mouth of said cavity and over surfaces of said flat terminals.

4. A piezoelectric crystal apparatus comprising: a piezoelectric crystal blank having a pair of major faces, a housing having a cavity therein for receiving said crystal blank, electrodes for said major faces, ring shaped elements for clamping peripheral portions of said major faces therebetween and for contacting said electrodes, a spring, a pair of contacting members positioned against opposite surfaces of said cavity, one of said contacting members engaging said spring and the other of said contacting members engaging the other of said ring shaped elements, said crystal blank, said ring shaped elements, and said spring being adapted to be assembled together between said contacting members and inserted into said cavity, flat terminals attached to said contacting members, said terminals projecting out of the mouth of said cavity and having bent portions extending across the lips of the mouth of said cavity, a closure for said cavity, and means for hermetically sealing said closure to the mouth of said cavity and over surfaces of said flat terminals.

5. A piezoelectric crystal apparatus comprising: a piezoelectric crystal blank having a pair of major faces, a housing having a cavity therein for receiving said crystal blank, electrodes for said major faces, ring shaped elements for clamping peripheral portions of said major faces therebetween and for contacting said electrodes, a spring, a pair of contacting members positioned against opposite surfaces of said cavity, one of said contacting members engaging said spring and the other of said contacting members engaging the other of said ring shaped elements, said crystal blank, said ring shaped elements, and said spring being adapted to be assembled together between said contacting members and inserted into said cavity, flat terminals attached to said contacting members, said terminals projecting out of the mouth of said cavity and having bent portions extending across the lips of the mouth of said cavity, a closure for said cavity, means for hermetically sealing said closure to the mouth of said cavity around said flat terminals, and a flat resilient member extending around three sides of said housing and having end portions engaging said closure and holding it in closed relation on said housing.

JOHN M. WOLFSKILL.

REFERENCES CITED

The following references are of record in the file of this patent:

UNITED STATES PATENTS

| Number | Name | Date |
|---|---|---|
| 2,392,993 | Morse | Jan. 15, 1946 |
| 2,394,999 | Keller | Feb. 19, 1946 |
| 2,434,266 | Fruth et al. | Jan. 13, 1948 |
| 2,456,795 | Samuelson | Dec. 21, 1948 |
| 2,458,987 | Fruth | Jan. 11, 1949 |
| 2,470,737 | Bach | May 17, 1949 |
| 2,505,370 | Sykes | Apr. 25, 1950 |